United States Patent [19]

Frahm et al.

[11] 4,074,986
[45] Feb. 21, 1978

[54] VALVED WATER CONTAINER WITH SEAL

[76] Inventors: Carl E. Frahm; Shirley E. Frahm, both of 1428 Oak Meadow Road, Arcadia, Calif. 91006

[21] Appl. No.: 777,357

[22] Filed: Mar. 14, 1977

Related U.S. Application Data

[63] Continuation of Ser. No. 680,071, April 26, 1976, abandoned, which is a continuation of Ser. No. 494,464, Aug. 5, 1974, abandoned.

[51] Int. Cl.² .............................................. B01D 46/10
[52] U.S. Cl. ...................... 55/502; 210/474; 222/545
[58] Field of Search ................ 55/309, 310, 384, 385, 55/391, 502, 504; 210/94, 251, 245, 466, 472, 474, 475, 476; 220/85 SP; 222/545, 559

[56] References Cited

U.S. PATENT DOCUMENTS

| | | | |
|---|---|---|---|
| 1,911,076 | 5/1933 | Gandola | 220/85 SP |
| 1,928,344 | 9/1933 | Wiggenhorn | 210/474 X |
| 2,155,259 | 4/1939 | Dickson | 55/502 |
| 2,335,458 | 11/1943 | Senyal | 210/474 X |
| 2,381,104 | 8/1945 | Burnham | 210/474 X |
| 2,822,964 | 2/1958 | Shore | 222/545 X |
| 3,152,729 | 10/1964 | Piker | 222/545 X |
| 3,186,604 | 6/1965 | Pentesco | 222/545 X |
| 3,445,001 | 5/1969 | La Raus | 210/94 |
| 3,550,782 | 12/1970 | Veloz | 210/94 |
| 3,667,197 | 6/1972 | Frahm et al. | 55/502 |

*Primary Examiner*—Thomas G. Wyse
*Assistant Examiner*—Robert H. Spitzer
*Attorney, Agent, or Firm*—Lyon & Lyon

[57] ABSTRACT

A combination sealing, venting, mounting and filter element is positioned between a replaceable inverted water bottle and a water reservoir from which the water is dispensed. The element is snugly fitted within the mouth portion of the reservoir or olla of plastic material into which a dispensing valve is threaded. The element includes a venting channel in communication with a filter housing which is releasably secured to such element adjacent to an upwardly extending flange portion, the flanged portion being apertured for venting and also shaped to provide a sealing portion engaging the bottle. Also the element has a downwardly extending portion near its periphery for engagement of a flat surface of a housing for the reservoir.

8 Claims, 6 Drawing Figures

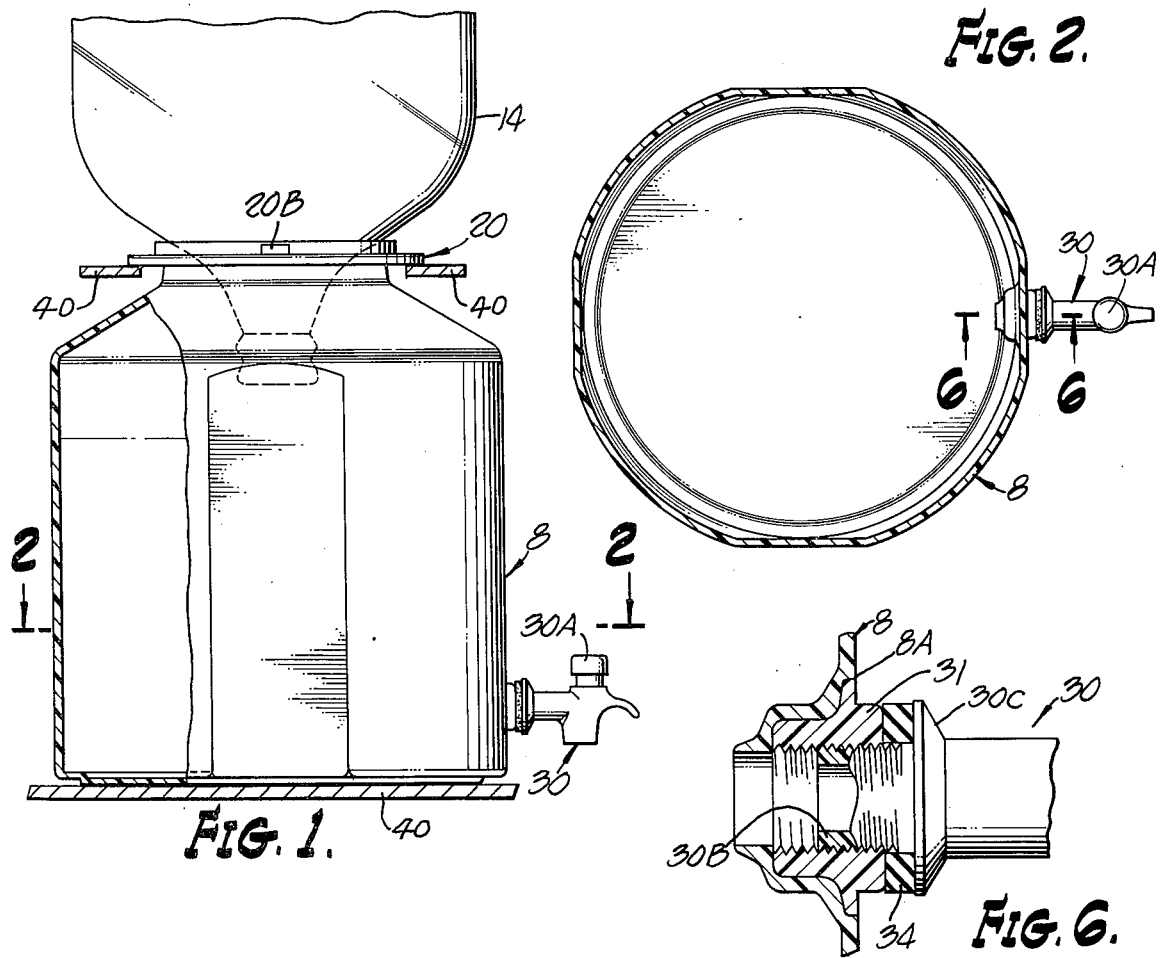
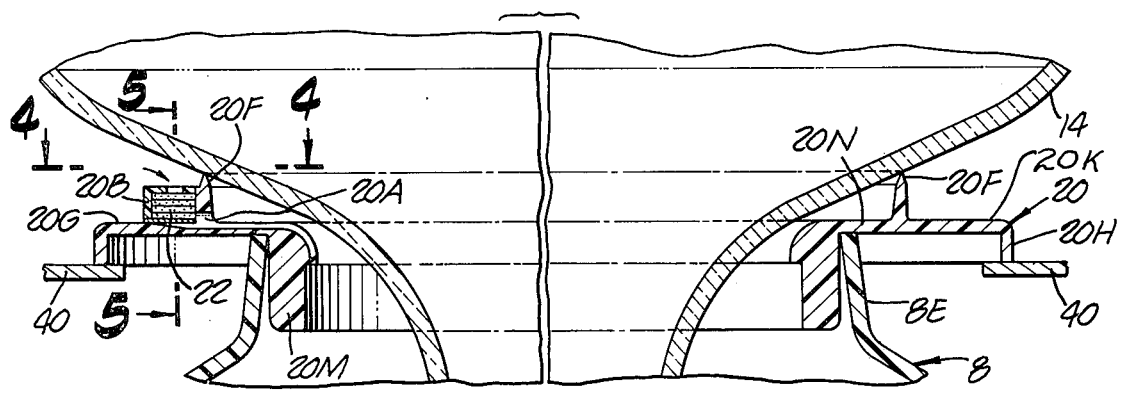
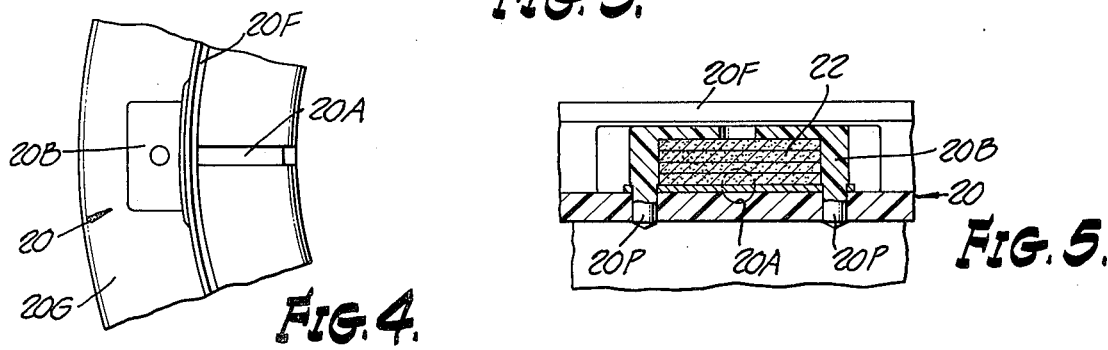

VALVED WATER CONTAINER WITH SEAL

The present application is a continuation of our pending U.S. application Ser. No. 680,071 filed Apr. 26, 1976 which in turn is a continuation of our U.S. application Ser. No. 494,464 filed Aug. 5, 1974, both abandoned.

The present invention relates to improved means and techniques useful in the art of dispensing bottled water and in general involves improvements in a filtered dispenser shown in our U.S. Pat. No. 3667197 issued June 6, 1972.

An object of the present invention is to provide an improved sealing element for positioning between a water bottle and an improved container referred to as an olla on which such bottle is supported in inverted condition.

Another object of the present invention is to provide an improved sealing element of this character which has the additional feature of providing a more dependable seal between the bottle and container which in this instance is an improved container or olla of plastic material with a faucet or valve body, also of plastic material releasable secured to such plastic olla.

Another object to the present invention is to provide an improved sealing element of this character which is snugly fitted within the new cylindrical olla to assure a good seal between these elements that prevent extraneous materials and crawling insects from entering space between the sealing element and the olla.

Other objects and advantages of the present invention will be apparent from the following description, reference being made to the accompanying drawings wherein:

FIG. 1 is a side view, partly in section of essential elements of a water dispenser embodying features of the present invention with a typical or conventional water bottle shown in relation to the combination sealing and venting and filtering means.

FIG. 2 is a view taken as indicated by the lines 2—2 in FIG. 1.

FIG. 3 is an enlarged sectional view of a portion of the structure shown in FIG. 1 but with the weight of a partially filled water bottle distorting the sealing means to effect a good seal.

FIG. 4 and FIG. 5 are views taken substantially as indicated by the lines 4—4 and 5—5 in FIG. 3.

FIG. 6 is a sectional view on line 6—6 of FIG. 2.

A feature of this invention is that the conventional water bottle 14 of five gallon capacity may be supported on the new reservoir or olla 8 which is of plastic material with an improved sealing element 20 therebetween, a feature of this new sealing element 20 is that it is snugly received within the cylindrical mouth portion of the olla 8 so as to not only provide a means for supporting the bottle 14 on the olla 8 but also to provide an improved sealing arrangement which is particularly effective against dust, dirt, and crawling insects all of which are prevented from entering the olla by virtue of the snug fitting of element 20 within olla 8.

The open mouth portion of bottle 14 extends through said element 20 and into olla 8 with a portion of said bottle being engaged by an annular sealing portion 20F of element 20. Water flows by gravity and is dispensed through valve 30 upon pressing the valve actuator 30A downwardly.

The olla 8 of plastic is formed using blow molding techniques with an apertured portion 8A to receive a plastic internally threaded bushing 31, such bushing 31 being permanently secured in opening 8A by an epoxy or other means. The valve 30 has an externally threaded nipple portion 30B threaded within bushing 31 with a sealing gasket 34 between bushing 31 and valve flanged portion 30C.

The annular seal structure 20 is also of plastic material and is formed, in accordance with an important feature of the present invention, with a downwardly extending cylindrical portion 20M which snugly engages the inside of the olla neck portion 8E so as to provide not only a firm support for the bottle 14 but also as a seal which prevents dirt, dust, crawling insects and the like from entering the olla 8 and also as a means sealing against possible leakage of water.

The presence of such sealing structure 20, if not vented would cause sub-atmospheric pressure to be developed in that internal space adjacent such seal when and as water is dispensed from the lower end of reservoir 8 and thus cause an objectionable diminution in rate of dispensed water flow. To obviate that problem, the sealing structure 20 is provided with a vent channel or bore 20A that extends through the sealing flange 20F of element 20 and terminates in a chamber 20B within which a replaceable filter element 22 is frictionally held.

A purpose of such filter 22 is to filter the air which passes from the surrounding contaminated and dust or dirt laden atmosphere through such filter 22 and channel 20A into the air space above water in reservoir 8 in the automatic process of maintaining the desired full atmospheric pressure above the water in reservoir 8.

For these multipurposes, the combination sealing, venting, and filtering structure is of the construction now described in detail.

The sealing structure 20 is of plastic material in the general form of a ring which in cross section includes, as seen in FIG. 3 the relatively heavy sealing and mounting flange 20M which is contiguous with a relatively thin circular base portion 20N from which a thin wall flexible and tapered sealing ring portion 20F extends upwardly as a cantilever to sealingly contact the outer surface of water bottle 14. Also, this base portion 20N has a generally L-shaped flange portion 20G extending radially outwardly therefrom with its downwardly leg 20H for sealingly contacting a flat surface of a mounting stand 40 that surrounds the olla 8 and upon which the olla 8 rests, the horizontally extending leg portion 20K being sufficiently prolonged and sufficiently thin in cross section to be flexible to assure a good seal with stand 40 despite any irregularities in its surface.

Likewise the base portion of element 20 between the two flanged portions 20F and 20M is sufficiently resilient to accomplish these purposes.

The previously mentioned chamber 20B which frictionally receives and retains filter element 22 is releasably secured to the sealing ring 20 as seen in FIG. 5 using a pair of circular extensions 20P snugly fitted within corresponding apertured portions in element 20.

This filter element 22 may be replaced each time a bottle is emptied and replaced by a filled bottle.

We claim:

1. An arrangement including a reservoir, said reservoir having a mouth portion, a mounting means for said reservoir, said mounting means including a flat surface adjacent to and spaced from said mouth portion of said reservoir so as to define an opening between said flat surface and said mouth portion, a replacement container for placement in an inverted position on said reservoir, an element for positioning between said flat surface of said mounting means and said container to close said opening, with said element serving the functions of mounting said container, closing said opening, and sealing and venting said reservoir, said element being annular and having a generally horizontally disposed base portion and having an inner opening generally of the size and shape of the mouth of said reservoir, a first relatively heavy sealing and mounting portion extending downwardly from said base portion for entering and snugly engaging an inner wall portion of said mouth portion to provide not only a firm support for the water container but also as a seal, a second relatively thin, flexible and tapered sealing ring portion on said base portion positioned outwardly of said first portion and extending upwardly from said base portion and being the sole means to engage said container, said second portion having a vent apertured portion extending therethrough, a third portion near the periphery of said base portion and extending downwardly therefrom for sealing contacting said flat surface of said mounting means for said reservoir, said second portion being located between said first portion and said third portion, said base portion having at least a part of its horizontal extension between said first and third portions of relatively thin cross section constructed and arranged such that the weight of the container acting on said second portion tends to flex said base portion to urge the first and third portions into sealing engagement with the reservoir mouth and the mounting means flat surface, respectively.

2. An arrangement as set forth in claim 1 in which said filter means includes a filter housing releasably secured to said element adjacent to and outwardly of a portion of said tapered sealing ring portion.

3. An arrangement as set forth in claim 1 wherein said reservoir is of plastic material and has a threaded portion in its wall near its bottom, and a valve structure releasably threaded in said threaded portion.

4. An arrangement as set forth in claim 1, said reservoir being entirely of plastic material with an apertured portion, an internally threaded bushing secured within said apertured portion and a valve structure releasably threaded in said bushing, said plastic material being relatively thin in comparison to the length of said bushing, said apertured portion being defined by an inwardly extending and integrally formed cylindrical portion, and means between the inner wall of said cylindrical portion and said bushing securing said bushing to said inner wall.

5. An arrangement as set forth in claim 4 in which said threaded bushing is also of plastic material and has an outer flat face, said valve structure incorporating a flanged portion and an externally threaded portion engageable with an internally threaded portion of said bushing, and a sealing element encircling said externally threaded portion between said flat face and said flanged portion.

6. An arrangement as set forth in claim 4 in which said securing means is an epoxy material.

7. An arrangement as set forth in claim 4 in which said cylindrical portion terminates in a radially inwardly directed flange portion for limiting inward movement of said bushing within said cylindrical portion.

8. A reservoir as set forth in claim 7 in which said inwardly directed flange portion and said cylindrical portion present a composite surface area comparable to an adjacent portion of said bushing and a permanent adhesive material between said composite surface area and said bushing.

* * * * *